United States Patent
Geer (10) Patent No.: US 7,966,258 B2
(45) Date of Patent: *Jun. 21, 2011

(54) SYSTEM FOR EFFECTING THE PAYMENT OF PAPER AND ELECTRONIC FINANCIAL INSTRUMENTS RECEIVED AT A PAYMENT FACILITY

(75) Inventor: Terry L. Geer, Jackson, OH (US)

(73) Assignee: Data Treasury Corporation, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/414,574

(22) Filed: Mar. 30, 2009

(65) Prior Publication Data

US 2009/0182666 A1     Jul. 16, 2009

Related U.S. Application Data

(63) Continuation of application No. 11/021,086, filed on Dec. 22, 2004, now Pat. No. 7,512,564, which is a continuation of application No. 09/309,131, filed on May 10, 1999, now abandoned, which is a continuation-in-part of application No. 08/680,218, filed on Jul. 11, 1996, now Pat. No. 5,930,778, which is a continuation-in-part of application No. 08/507,856, filed on Jul. 27, 1995, now Pat. No. 5,583,759, which is a continuation of application No. 08/156,190, filed on Nov. 22, 1993, now abandoned.

(51) Int. Cl.
   *G06Q 40/00*     (2006.01)
(52) U.S. Cl. ............................................. 705/45; 705/10
(58) Field of Classification Search ............... 705/10–44; 70/30–45
   See application file for complete search history.

(56) References Cited

U.S. PATENT DOCUMENTS

| | | | |
|---|---|---|---|
| 4,948,174 A * | 8/1990 | Thomson et al. ................ | 283/58 |
| 5,175,682 A | 12/1992 | Higashiyama et al. | |
| 5,187,750 A | 2/1993 | Behera | |
| 5,198,975 A | 3/1993 | Baker et al. | |
| 5,220,501 A | 6/1993 | Lawlor et al. | |
| 5,237,159 A | 8/1993 | Stephens et al. | |
| 5,265,007 A | 11/1993 | Barnhard, Jr. et al. | |

(Continued)

FOREIGN PATENT DOCUMENTS

WO      WO 01/46846      6/2001

OTHER PUBLICATIONS

Uniform Electronic Transactions Act 1999, National Conference of Commissioners of Uniform State Laws, 1999.

(Continued)

*Primary Examiner* — Frantzy Poinvil
(74) *Attorney, Agent, or Firm* — Hershkovitz & Associates, LLC; Abraham Herskovitz (57) ABSTRACT

A system for expediting the deposit, settlement and submission into the payment system for collection of funds represented of commingled paper and electronic financial instruments that are received by a payee at a location remote from the payee's collecting and clearing bank in which the instruments are separated at a payer's location where and the separated instruments accompanied by cash letters are delivered into the payment system and the payments' deposit with the collecting and clearing bank is coordinated with the timing of a settlement of accounts in the payment system.

13 Claims, 4 Drawing Sheets

U.S. PATENT DOCUMENTS

| | | | |
|---|---|---|---|
| 5,283,829 A | | 2/1994 | Anderson |
| 5,326,959 A | | 7/1994 | Perazza |
| 5,373,550 A | | 12/1994 | Campbell et al. |
| 5,444,794 A | | 8/1995 | Uhland |
| 5,504,677 A | | 4/1996 | Pollin |
| 5,524,073 A | | 6/1996 | Stambler |
| 5,583,759 A | * | 12/1996 | Geer .............................. 705/45 |
| 5,649,117 A | | 7/1997 | Landry |
| 5,717,868 A | * | 2/1998 | James ............................ 705/35 |
| 5,825,506 A | | 10/1998 | Bednar et al. |
| 5,848,400 A | * | 12/1998 | Chang ............................ 705/35 |
| 5,884,288 A | | 3/1999 | Chang et al. |
| 5,930,778 A | | 7/1999 | Geer |
| 5,940,844 A | | 8/1999 | Cahill et al. |
| 5,963,659 A | | 10/1999 | Cahill et al. |
| 6,549,624 B1 | | 4/2003 | Sandru |
| 6,990,224 B2 | * | 1/2006 | Warren et al. ................. 382/137 |
| 7,283,977 B1 | | 10/2007 | Tyson-Quah |
| 7,386,511 B2 | * | 6/2008 | Buchanan et al. .............. 705/45 |
| 7,512,564 B1 | | 3/2009 | Geer |

OTHER PUBLICATIONS

Retail Payments Issues—Experience With Electronic Check Presentment, Jul. 1998.
A Comparison of Social Costs and Benefits of Paper Check Presentment and ECP with Truncation, Jul. 1997.
Payments, Clearance, and Settlement—A Guide to the Systems, Risks, and Issues, Jun. 1997.
Alternative Roles for the Federal Reserve in the Interbank Retail Payment System, Apr. 1997.
Federal Reserve Bank Service Pricing, 62 FR 14146.
Operating Rules of the National Association for Check Safekeeping, 1992.
Availability of Funds and Collection of Checks and Other Items and Transfers of Funds (regulation J)—52 FR 47112, Dec. 1987.
Federal Reserve System Request for Comment for several new services to depository institutions, 52 FR 47171, Dec. 1987.
Electronic Fund Transfers; Proposed Rule and Proposed Update to Official Staff Commentary, 49 FR 2204, Jan. 1984.
Better Resting Place for Bank Checks?, 1980 ABA Banking Journal, May 1980.
What's Ahead for the Wire Services?, 1980 ABA Banking Journal, Feb. 1980.
Check Truncation—The American Banker, May 1979.
BoFA is Doubtful on No-Check Plan—The American Banker, Apr. 1979.
Fed Begins National Truncation Study—The American Banker, Mar. 1979.
Travelers Express Seeks to Offer S&Ls Check Truncation—The American Banker, Feb. 1979.
Now Accounts: A Way of Life in New England—The American Banker, Jan. 1979.
Federal Reserve Bulletin Feb. 1978—Statements to Congress, vol. 64 Federal Reserve Bulletin No. 2, p. 90.
Check Truncation paper by Bank Administration Institute, 1980.
Carreker, "Strides in Electronic Checking Transforming Payment System," *Bank Management*, vol. 68, No. 3, Mar. 1992, pp. 18-30.
Sgambati, "Payment Consolidation Service," *Consumer Bill Payments Update '92*, Apr. 22, 1992, 6 pages.
U.S. Appl. No. 09/309,131, filed May 1999.
U.S. Appl. No. 08/156,190, filed Nov. 1993.

* cited by examiner

SYSTEM FOR EFFECTING THE PAYMENT OF PAPER AND ELECTRONIC FINANCIAL INSTRUMENTS RECEIVED AT A PAYMENT FACILITY

RELATED APPLICATIONS

This application is a continuation of U.S. Patent Application no. 11/021,086, filed on Dec. 22, 2004, now U.S. Pat. No. 7,512,564, which is a continuation of U.S. patent. application Ser. No. 09/309,131, filed on May 10, 1999, now abandoned, which is a continuation-in-part of U.S. patent application Ser. No. 08/680,218, filed on Jul. 11, 1996, now U.S. Pat. No. 5,930,778, which is a continuation-in-part of U.S. patent application Ser. No. 08/507,856, filed on Jul. 27, 1995, now U.S. Pat. No. 5,583,759, which is a continuation of U.S. patent application Ser. No. 08/156,190, filed on Nov. 22, 1993, now abandoned. Each application has the same inventor and assignee as the present invention and all are incorporated herein by reference for all purposes.

FIELD OF THE INVENTION

The present invention relates generally to the processing of checks, electronic payment instructions (EPIs) and other cash items (collectively "financial instruments") presented to a depository bank by a payee for collection. In particular, the present invention relates to a mechanism and system for expedited processing of checks, EPIs and cash items by a payee and a depository bank to reduce the time within which such items are paid, or returned, by the payor bank on which such items are drawn.

This invention relates to a system for the coordination of the physical transport and/or electronic transmission of financial instruments with the electronic processing of a deposit by the payee of the instrument into a collecting and clearing bank. The financial instruments, whether they are in paper or electronic form, are prepared for submission into the check payment system. The deposit and collection of funds represented by the financial instruments is expedited.

In the prior art, the deposit and payment of a check tendered for an amount due is effected in accordance with well established traditional procedures. The drawer (the check writer) establishes a checking account containing funds with a bank. A check is written against the drawer's account in favor of the payee. The payee indorses the check and deposits the check in the payee's account at the bank of first deposit for collection. That bank handling the payee's account and the deposited check presents the check through the check payment system to the drawer's bank for payment. This bank in turn debits funds from the drawer's account, and typically archives the check or a copy of the check and/or returns the physical check to the payor, and the cycle is thus completed. In the sequence of check handling, a check transferee remits, or is responsible for, the funds represented by the check to its transferor if the check is honored by the drawee.

The multiple steps in the process and the physical handling of checks (used as a term herein to refer generically to a financial instrument in paper form) involve a period of "float" time for the funds represented by the check. Recent banking regulations have shortened the traditionally permitted times for check processing and collection.

The receipt of 10,000 to 1,000,000 or more checks or EPIs (used as a term herein to refer generically to a financial instrument, or payment instruction to deliver value equivalent to cash, in electronic form) drawn on numerous different banks is not unusual for many large businesses such as credit card issuers, utilities, mail order processors, and other large commercial entities. In situations where large numbers of checks and EPIs are involved, the handling of individual checks and EPIs and effecting their posting, deposit and clearing is a complex multiple step process.

This invention expedites the processing of a deposit by the payee of a paper or electronic instrument or payment order into a collecting and clearing bank (referred to generally as the payee bank, bank of first deposit, or depository bank). Such instruments and payment orders are prepared, processed, and submitted into a payment system such as the Federal Reserve or private clearing houses. The deposit and collection of the funds represented by these instruments are expedited according to the system of the present invention. Benefits of the present invention are realized by banking customers that receive as payees large numbers of payments to process on a continuing basis, such as utilities, bill payment companies, credit card companies, mail order processors, or other large commercial entities.

Typically in the prior art involving checks, the deposit and payment of a check tendered to a payee for an amount due is effected in accordance with traditional procedures for paper-based processing. The drawer (the check writer) establishes an account containing funds with a bank of the drawer's choice (the drawee bank or the payor bank). A check or similar financial instrument is written against the drawer's account in favor of the payee and physically delivered to the payee, usually by mail accompanied by the payor's invoice or a payment stub provided to the check writer that provides information about the check writer's account with the payee. The payee typically indorses the checks and deposits the checks in the payee's account at its depository bank or bank of first deposit for processing through the payment system for ultimate presentment at the check writer's payor bank for payment of the funds represented by the instrument. Internal accounting procedures of the payor reconcile the invoice and the payment with the payor's account with the payee. Upon receipt of the check, the payor bank debits funds from the drawer's account, and may archive the check or a copy of the check, and/or return the check to the check drawer. Thus, the payment cycle is completed, typically with the paper check or financial instrument making the complete cycle from drawer to payee, to depository bank, through the check clearing system to the payor bank for archival storage and/or return to the check drawer. The processing of EPIs is generally analogous, beginning with a payor's instruction, or a payee's instruction on behalf of the payor, to the institution where the payor's account is maintained to initiate a payment of a specified fund amount from the payor's account at the institution to the payee with regard to a specified payee account. The institution's account statement to the payor will usually report the payment amount, date and payee for an EPI in a manner comparable to an entry with regard to a paper check. In the conventional check clearing systems, the payee first indorses a check and delivers the check for deposit in the payee's account at a bank. The depository bank indorses for its own account the checks it receives, and sorts and bundles the checks. The depository bank prepares a cash letter for each bundle of checks sorted, or a cash letter that accompanies a group of check bundles. A cash letter may accompany a single bundle of checks or more than one bundle of checks. A typical cash letter contains routing information, the number and total dollar amount of the checks in a particular bundle, and optional additional information. The cash letters and check bundles are then introduced into the payment system.

The traditional multiple steps in the processing and physically handling checks, and in the preparation and transmission of cash letters, result in the float of funds represented by the check. Float is the time cost of money following deposit of the check by the payee at the depository bank until actual payment of the funds is made by the payor bank from the check drawer's account and those funds become available for use by the payee. If the check is dishonored by the payor bank, the check is returned through the clearing system in reverse direction, directly or indirectly, from payor bank to depository bank in order for the depository bank to debit the payee's account for the dishonored check. The route of the dishonored check from payor to depository bank need not precisely retrace the route of the check from depository bank to payor bank, but may be a direct return from payor bank to depository bank, or may follow an indirect route. Dishonored checks are typically caused by insufficient funds in the drawer's account, a stop payment order in place for the particular check, or other reasons.

There are three payment related conditions for funds deposited in a payee's account at the depository bank. The first stage is a book credit of funds, denoting checks deposited by the check payee to its account at the depository bank, as noted on the books of the depository bank, but not necessarily available for use by the payee. The second stage is available funds, credited to the account of the payee at the depository bank and available for use or withdrawal by the payee. The time between book credit and availability of funds is determined by federal regulation, bank policy, and/or negotiated terms between the bank and its customers. The third stage is collected funds in which the deposited check has been honored by the payor bank and all risk of return or dishonor is eliminated. The most certain policy with regard to funds for a depository bank is to make funds available, or withdrawable, only when they have been collected. Reducing the time between the book credit and the collection of funds is advantageous to bank customers, to the banks and to the business community in general by making funds more quickly available for productive economic uses. Faster collection is an object of the present invention.

In the usual sequence of check handling, every transferee, in the sequential chain of the check transit from the check drawer to the payee and ultimately to the payor bank, the previous party from whom the check is received is responsible for collection and payment of the check. For example, the payee is responsible to the bank of first deposit, the bank of first deposit is responsible to the next bank, and so on. The time between book credit of a check and its collection (or dishonor) is reduced by the present invention. Reduced float is advantageous to the payee because it results in the expedition of collected funds into the payee's account. Traditional banking practices may inherently delay the ability of the payee to withdraw funds represented by the check presented by a payee for collection until the depository bank makes certain that the funds have been collected at the payor bank from the drawer's account. Since the large majority of checks presented for payment are honored by the payor bank, banking practice does not send a notice honoring a check, only notice of dishonor. To insure against risk of loss to the depository bank by a payee withdrawing funds not subsequently collected from the drawer's account at the payor bank, banking practice requires a waiting period sufficient to insure that a dishonored check would be made known to the depository bank in time to reverse the depository bank's book credit of the funds to the payee's account and to deduct the uncollected funds from the amount of the book credit. Use by the payee of subsequently uncollected funds is, at best, an interest-free loan to the payee even when a solvent payee promptly redeposits the uncollected amount in its account at the depository bank. At worst, the entire amount of a check could be lost if it is uncorrectable. Recent banking regulations, such as Federal Reserve Regulation CC, mandate a shortened time during which a payee must wait for access to its deposited and credited funds. Thus, expedited procedures for processing and collecting checks reduce the risk of loss to a depository or subsequent collecting bank through dishonored checks. Expedited procedures also benefit the payee-depositor by permitting the depository bank more promptly to release funds for payee use, offering customers more effective cash management.

The receipt of 10,000 to 1,000,000 or more checks or EPIs within a predetermined period drawn on numerous different banks is not unusual for large businesses such as credit card issuers, utilities, and mail order processors. In situations where large numbers of payments are involved, the handling of individual checks and EPIs and effecting their posting, deposit and clearing is a complex multiple step process, additionally complicated for the recipient payees of such checks, because a payment identifier, a stub, invoice, order form or the like is usually enclosed along with each payment check or is associated with an EPI record. With paper instruments, the payee must open each envelope, and record, reconcile and separate the payment stub from the check, send the payment stub for archival storage (such as in microfilm or electronic media) or destruction, and send the check to the payee's bank for deposit, collection and credit to the payee's account through the check payment system. For EPIs an analogous record processing sequence is required, although physical handling is eliminated. In both instances, however, the payor most often receives a tangible record of the payment, such as an entry in the succeeding account statement from the payor's financial institution and/or from the payee.

There exists a need for a system whereby the conventional deposit and collection of funds represented by a check or other financial instrument, whether the instrument be paper or electronic, may be expedited and the internal processing thereof made more efficient, particularly for businesses that regularly receive large numbers of checks EPIs and other forms of payments from their customers. The invention eliminates repetitive processing steps and begins the banking process at the payee's point of receipt as an adjunct to the payee's internal accounting.

Lock box or other means of collection consolidation and acceleration known in the prior art do not achieve the efficiency of the present invention. Typical lock box services, offered by cash management divisions of commercial banks or other entities, commonly entail routing customer payment checks to the payee through a designated post office box. The payments would generally be collected from a post office box by the bank or cash management service at predetermined time intervals (e.g., several times a day) and removed from envelopes. The payment stubs are routed to the payee for accounting while the accompanying checks, credited to the accounts associated with particular stubs, are routed to the depository bank to begin the customary collection process. While this procedure achieves an efficiency of scale by aggregating and more rapidly depositing customer checks to the account of the payee, payment stub processing by the payee, paper check processing by a lock box manager or bank, and the physical transportation of both between lock box location, payee and depository bank and their final, physical processing in the check payment system are still conducted conventionally, slowly and repetitively.

A variation of a lock box procedure is the Payment Consolidation Service offered by NBD, N.A. of Detroit, Mich. In this procedure, invoice payments by check are sent directly to the depository bank which handles the accounting on behalf of the payee. The bank transmits certain customer accounting information electronically to the payee. Certain consolidated summaries may also be prepared by the depository bank on behalf of its customer, the check payee. While such a consolidation service may shift certain aspects of the customer invoice payment accounting function from the payee to the bank, the system otherwise employs conventional bank processing procedures for the physical sorting and transport of checks in the check payment system.

The present invention is directed to the bank customers (payees) who maintain customer accounting functions internally. For such bank customers, the present invention permits the payee to adapt and coordinate internal bill payment, accounting, and check and EPIs processing procedures with procedures that present payments into the payment system for collection in instances where paper and electronic payments are commingled. Stephens et al., U.S. Pat. No. 5,237,159, describes electronic means for the preparation of various electronic files containing check and depositor information in a form suitable for rapid verification, transmission, and comparison with paper checks when the checks later overtake the electronic transmissions in the check clearing process. The present invention is directed not to specific forms of electronic formatting and arrangement of the check or EPI information for rapid electronic transmission, as is Stephens et. al. Rather, the present invention is directed to an integrated system involving predetermined processing steps, beginning at the point of receipt, which facilitate payee internal accounting for the checks and EPIs it receives and which expedites the flow of payment and cash letter information through the payment system as a bank of first deposit monitors the payee's account at the bank with regard to the payments received, making use of any suitable means for electronic file arrangement and transmission.

A recent occurrence with payments is that checks are being supplanted by electronic payment orders such as ACD payment, automatic checking debit, and third-party payment processing, such as by CheckFree®, and the payment payee will receive a commingled mixture of paper and electronic instructions causing ultimate payment to be made to the payee from a check writer's or bill payor's account. Debit instructions against a payor's account may arise from paper checks or electronic instructions both of which as noted above for purposes of this application, are considered "financial instruments". In addition, the truncation of the physical handling of paper instruments at some point in processing, and the substitution of an electronic record in lieu of the physical paper check at a point in the payment and clearing process is increasingly being implemented. Thus there exists a need for a system whereby the conventional deposit and collection of funds represented by a check, EPI or other financial instrument may be simplified and expedited, particularly for large business institutions such as public utilities, mail order processors, and the like which receive large numbers of payments in the form of paper instruments or electronic payment orders on a regular basis.

It is an object of this invention to provide such an expedited check deposit and EPI collection mechanism and to reduce the amount, complexities and requirements for payment of funds represented by paper and electronic financial instruments from a payor's account. It is a further object to eliminate duplicative data capture steps and multiple handling involved in the payee's and the bank of first deposit's handling of the same instrument.

SUMMARY OF THE INVENTION

The foregoing objectives are achieved in an integrated system for effecting the deposit, settlement and submission of financial instruments into the payment system for collection of funds. The financial instruments received by a payee at a location remote from the payee's collecting and clearing bank are presented for payment to the multiple institutions on which the instruments are drawn. A sorter at a first location established by the payee receives the financial instruments and sorts the instruments according to the predetermined sort pattern categories determined by the payee's collecting and clearing bank. Indorsements on behalf of the payee and the collecting and clearing bank with respect to each instrument received are applied to each instrument by a printer. The sorter further assembles the sorted instruments into discrete groups with respect to the predetermined sort pattern categories and associates one or more cash letters with each assembled group of instruments. A communication link is established between the first location and the collecting and clearing bank which reports to the collecting and clearing bank information in the cash letters in anticipation of a deposit in the payee's account corresponding to the cash letter. The present invention also includes an electronic means which transmits payment information regarding groups of instruments and the one or more cash letters from the first location into the check payment system. A central processing unit and communication link predetermines the timing and monitors the transport of the sorted checks. The processing unit also coordinates the checks' deposit with the collecting and clearing bank in a sequence coordinated with the timing of a settlement of accounts in the check payment system. The invention includes alternative embodiments involving a bank of first deposit and a bank of second deposit.

The present invention comprises an integrated system for effecting the efficient submission of checks and other financial instruments into the payment system for collection of funds. The financial instruments are received by a payee at a location remote from the payee's collecting and clearing depository bank and are presented for payment to the multiple institutions on which the instruments are drawn. In one embodiment, electronic scanning means at a first location established by the payee receives the financial instruments, scans and extracts necessary data therefrom including the data of the magnetic ink character recognition (MICR) line of the instrument, adds necessary data such as the amount and a document identification number to the electronic information associated with each check, and sends this electronic information to the payee's depository bank for further electronic sorting and processing both with regard to the introduction of the checks into the payment system and the crediting of funds represented by the checks to the payee's account at the bank. In this first embodiment, the paper financial instruments are typically imaged (electronically, digitally, optically, on microfilm or disk, or otherwise) for archival storage at the payee's location remote from the payee's depository bank, substantially contemporaneous with the capture of the financial or other information on the instrument. The paper instrument itself may then be disposed of, eliminating the need for any additional mechanical sorting, indorsing or imprinting by either the payee or the payee's depository bank.

Another embodiment of the present invention sends the paper checks after processing at the point of receipt from the payee's location into the check clearing and collection system. Mechanical sorting of the paper checks is performed at a first (typically the payee's) location according to predetermined sort pattern categories specified by the payee's depository bank. Indorsements on behalf of the payee and the depository bank with respect to each instrument received are applied to each instrument. Other information such as the amount and/or a document identification number may also be imprinted on the instrument. In the sorting process, the mechanical sorter assembles the sorted instruments into discrete groups with respect to predetermined sort pattern categories and associates one or more cash letters with each assembled group of instruments according to categories determined by the payee's bank of first deposit. A communication link is established between the payee's location and the depository bank. Information pertaining to the checks and/or the cash letters in anticipation of a deposit in the payee's account corresponding to a cash letter (or cash letters) is transmitted from the payee to the collecting and clearing depository bank. An electronic means transmits payment information regarding the groups of sorted instruments and the one or more cash letters from the payee's location into the check payment system on behalf of the payee's depository bank.

A central processing unit and communication link determines the timing of check transport and information transmissions according to criteria specified by the depository bank, consistent with schedules appropriate to the check payment system, and monitors the transit of the sorted checks. The processing unit also coordinates information about the deposit of funds represented by the checks in the payee's account at the depository bank in a sequence coordinated with the timing of settlement in the check payment system according to a schedule determined by the depository bank. It is an object of the present invention to provide an expedited funds deposit and collection mechanism for checks and other financial instruments received by a payee. A further object of the present invention is to reduce costs of collection and deposit of paper instruments on behalf of the payee and payee's depository bank.

Another object of this invention is to reduce the complexities and requirements for physical transport of financial instruments where paper checks and financial instruments are involved and to reduce the physical transport per se of checks in the collection process.

It is a further object of the present invention to eliminate duplicative data capture steps and multiple handling involved in the payee's and the bank of first deposit's handling of the same payment and to coordinate the payee's internal invoice accounting system with the submission of checks and/or EPI received by the payee in the payee's system resulting in efficiencies in account processing and in funds collection.

Other objects of this invention include the elimination of duplicative processing associated with financial instruments and payment stubs or electronic identifier records which accompany them, the reduction of errors, adjustments, rejects, balancing time, item handling and personnel costs.

These and further objects of the invention will be more readily understood with reference to the following description of the preferred embodiment taken in conjunction with the figures in which:

DESCRIPTION OF THE PREFERRED EMBODIMENT

In brief a system is provided which structures the processing mechanisms for checks and EPIs to expedite (1) the processing of payments; (2) the submission of the checks and EPIs for payment into the payment system and (3) the deposit of funds represented by the checks and EPIs into a depositor's account.

In the system, a payee that receives a large number of payments drawn on numerous different banks, will, at the instruction of the payee's depository bank (i.e., its bank of first deposit), upon processing the payments in its own accounting records (such as by recording a payment to a customer's account) sort the checks according to MICR (Magnetic Ink Character Recognition) data, including routing transit number and customer account number. The sort by MICR data may be in a sort pattern determined by volume in a predetermined geographic area, the financial institution(s) on which the checks were drawn, or the geographic or commercial area of a bank that will otherwise accept a check for clearing and collection. EPI instructions include information comparable to that derived from a standard MICR line on a check authorizing a debit from a payor's account.

In addition to sorting received payments, the payee indorses the payment instrument for its own account, and on behalf of its depository bank, which is the bank of first deposit to which the physical check would be otherwise delivered. In a check, an institutional indorsement is conventionally applied as a stamp that prints payment instructions and the identity of the indorser on the reverse side of a check. Like instructions are included with an EPI record or the truncated record of what was formerly a physical check. The bank of first deposit is an agent for its depositor and assumes liability for obtaining payment of the instrument in subsequent processing.

Following sorting and indorsement, the payee then delivers the payment instruments on behalf of the bank of first deposit into the payment system along with a cash letter in the name of the bank of first deposit, where the payments are cleared and returned to the check writer's bank for ultimate payment against funds in the payor's account, and the payor's account is appropriately debited. The "payment system" includes clearing institutions such as the Federal Reserve Banks, correspondent banks, The National Clearinghouse Association (described in U.S. Pat. No. 5,265,007), ACH and like mechanisms. By reason of its direct relationship to the payment system, the collecting and clearing bank is a part of the payment system.

Figure 1:
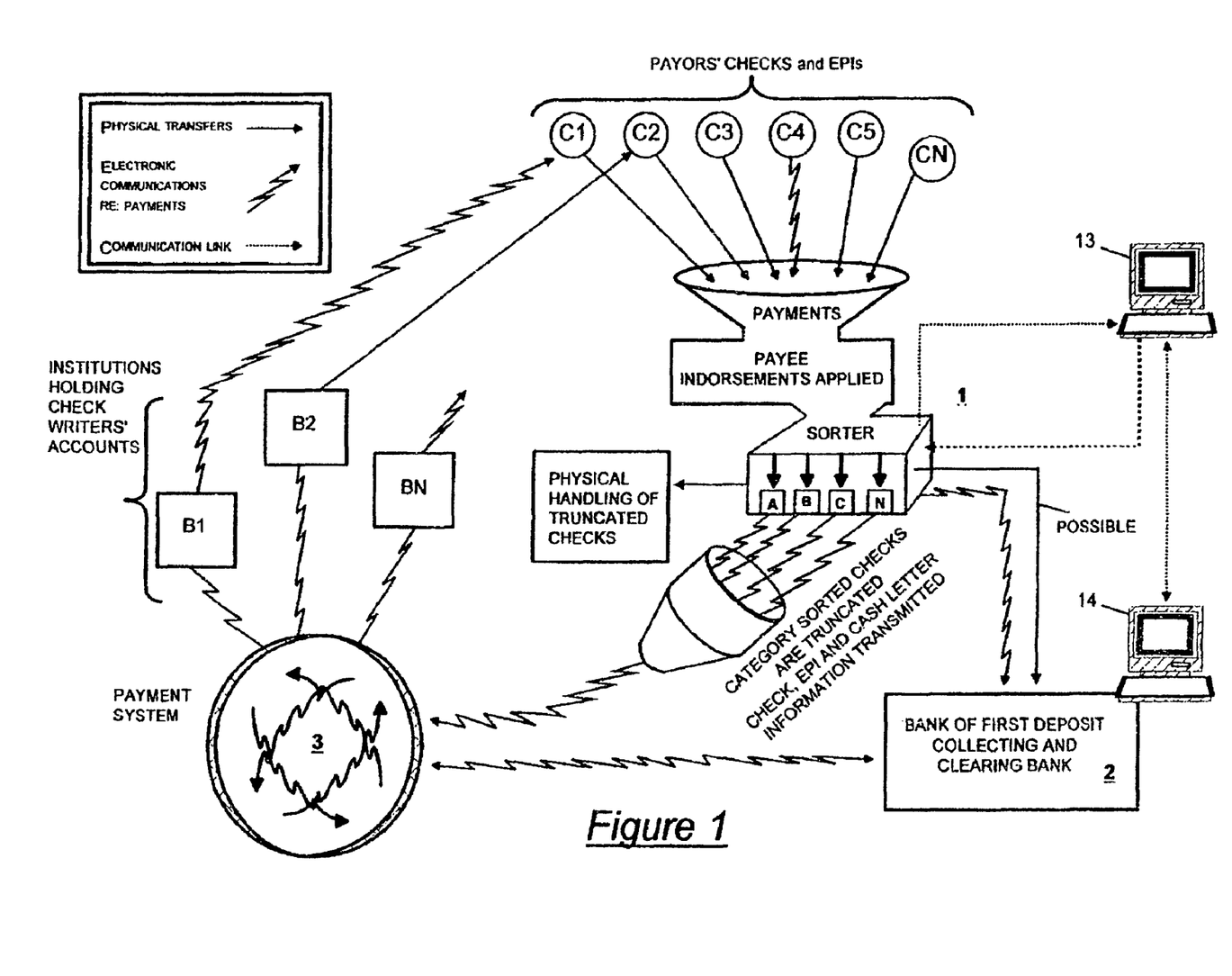
FIG. 1 is a diagram showing the processing of payment checks from the payee into the payment system when physical handling of the checks is truncated and electronic files or records of the checks are substituted. The electronic records and cash letter are submitted by the payee into the payment system on behalf of the bank of first deposit for ultimate payment from the account of the check writer, as such activities are coordinated by processing means at locations of the check payee and the depository bank.

In the examples, the legend box appearing in FIG. 1 indicates that physical transfers are denoted by a solid line, electronic information about financial instruments by a zig-zag line and data communication by a dashed line.

EXAMPLE 1

The system is illustrated in FIG. 1 in which the check payee and bank customer 1 may be a public utility such as a telephone company. In this example, the payee is a banking client of the bank of first deposit. Typically such a utility will receive from its customers, C1, C2, C3, C4, C5, CN, etc., tens of thousands, if not hundreds of thousands, or millions, of payments per month, drawn on numerous different banks, savings and loans, credit unions or other demand account providers.

In the prior art of checking accounts, once the utility processed and indorsed checks to reconcile its own and its customer's accounts, the utility would physically transport to and deposit the indorsed checks with its depository bank 2 where the utility maintained an account. The depository bank in turn would credit the utility's account for the checks, and the depository bank, being the bank of first deposit, would separately indorse the checks on its own behalf and collect the checks though the check payment system 3, which leads to the ultimate payment of the check from the check writer's account at banks B1, B2, B3 or BN.

In that process, the bank of first deposit would physically sort the checks received from and deposited by the utility. Check sorting by MICR codes, the addition of the check amount to the MICR line, and other facets of check processing, including MICR code sorting by routing transit numbers, and the use of sorter machines, are known. The sorted checks would then be delivered in a cash letter (i.e., a listing of checks and the amounts of the checks drawn on a particular institution or group of institutions from a particular area) into the check payment system where settlements with other financial institutions on which the checks were drawn would be effected. Such a settlement involves the physical transport and exchange of the checks, and a calculation of aggregate amounts owing and payable by participants in either a bi-lateral or multi-lateral settlement at a predetermined time. After settlement, the check payor's bank would physically have custody of the check and would conventionally process the check for its customer's account.

In contrast, the present system provides that the utility, in its own processing of payments, which may be checks or EPIs, at a site distant from the location of the depository bank, indorses the payments (1) on its own behalf and (2) on behalf of the bank of first deposit where the utility or check payee 1 maintains an account for the deposit of payments. In processing checks, the utility adds the check amount to the information record derived from the MICR line and appropriate indorsement indicia such as the indorsement by the payee and an indorsement on behalf of the bank of deposit.

The payments are sorted by the utility or check payee in accordance with predetermined sort pattern categories selected by the depository institution; and, the utility prepares an electronic cash letter in the name of the depository bank for each group of payments within the predetermined sort category. Typically when an EPI is received, the EPI is temporarily maintained in a buffer or memo post file or the like for batch processing at a predetermined schedule typically determined by the depository bank. Similarly the electronic records of check information, whether the checks will be truncated or not, may also be maintained in a buffer or memo post file for batch processing commingled with the EPI records. The sort may be by individual bank, geographic location, clearinghouse affiliation or other criteria determined by the depository bank. Physical handling of the checks is truncated and remaining only is the electronic record of the check which in addition to the conventional MICR information, may include an image, for example, of the payee in the payee field of the check as written by the check drawer, optionally in a second electronic record of the payment useful with the payee's internal accounting process, or transmitted through the clearing process and returned to the payor in an account statement.

Upon the sorting and preparation of the cash letter, the utility or check payee 1 transmits, between the utility's CPU (Central Processing Unit) 13 and the depository bank's CPU 14, payment information (usually in correspondence with MICR line information (amount, bank routing number, customer account number, check number and other predetermined information)) to the depository bank 2, and the bank thus has information for crediting the utility's deposit account for the funds represented by the payments and for other banking purposes with respect to the utility's account. The utility, or check payee 1, however, in lieu of actually transporting the physical checks to the depository bank 2 to make the deposit, truncates the checks and accompanying cash letters and continues the process electronically with cash letters and check records submitted directly into the payment system as an agent of the bank of first deposit. The direct transmission of electronic information into the payment system is depicted by line 10 in FIG. 1 connecting payee 1 and payment system 3. An electronic image of the payment information may be created for subsequent display to the payor, for example, in the payor's periodic checking account statement, delivered as a physical document or electronically transmitted to the payor.

With reference to the Example, it is evident that improvements in efficiency and time, and a reduction in paper handling is achieved by the system, compared with the instances of physical handling and duplication in the prior art process. The conventional step of delivering the physical items to the bank of first deposit is eliminated; two indorsements of the check are applied at the same time, instead of twice at the different locations of the payee and the bank of first deposit; and truncation allowing down line electronic processing expedites clearing and payment in the payment system. The faster availability of funds to all payees in the clearing sequence is achieved. It is necessary, however, that the timing of steps in the present system be synchronized and coordinated between the depositor, the bank and the check payment system with respect to the indorsing and sorting of checks, the transmission of payment (check MICR) information, the electronic submission of cash letters and check record information into the payment system, and the deposit, collection and verification of funds represented by the checks.

EXAMPLE 2

Figure 2:
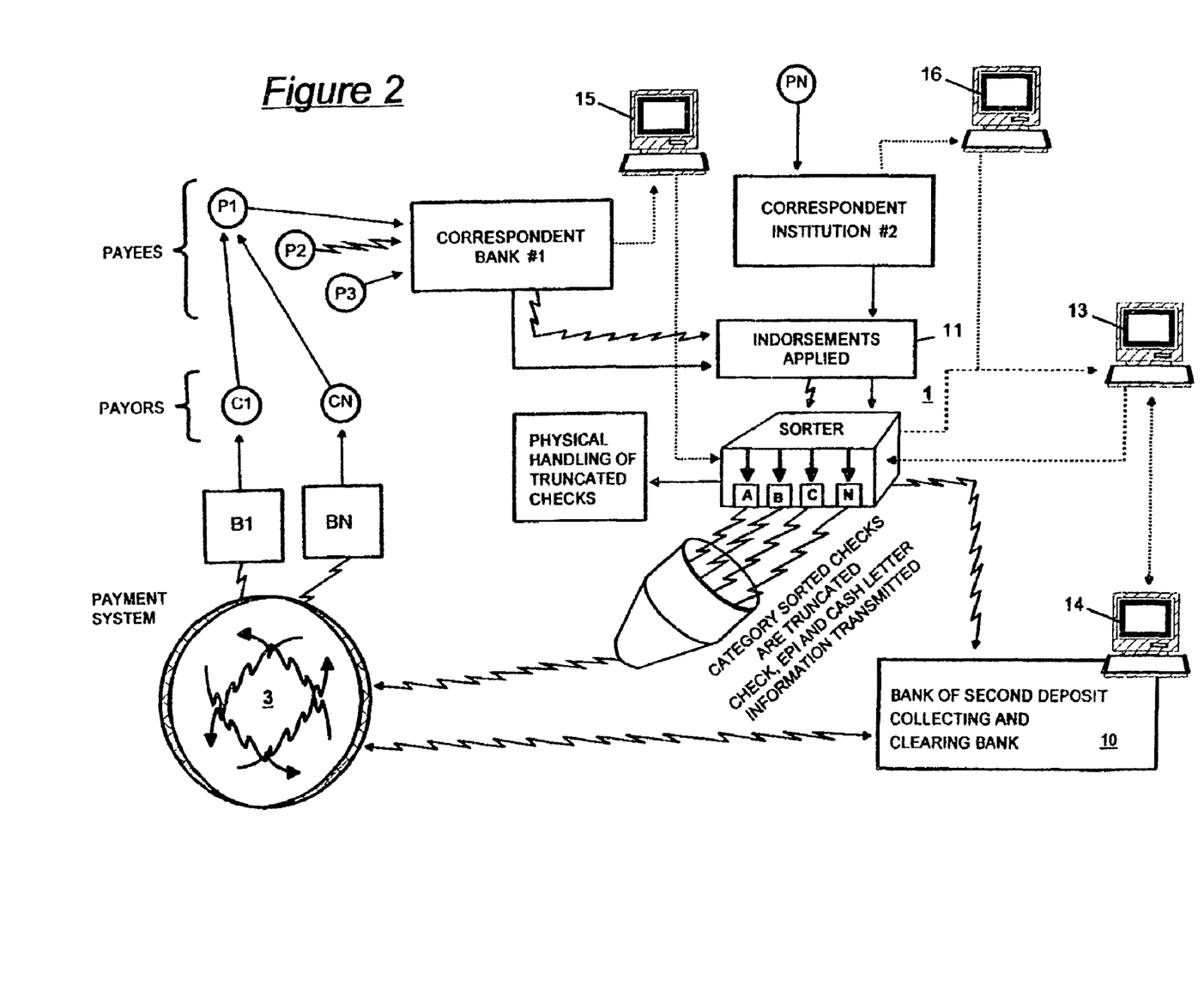
FIG. 2 depicts an alternate system involving the truncated processing of checks useful in correspondent banking relationships.

An alternative utilization of the invention is shown in FIG. 2, where a collecting and clearing bank 10 is a provider of payment processing services to other correspondent banks or financial institutions, correspondent Bank #1, correspondent Institution #2, etc. Here, however, correspondent Bank #1 and correspondent Institution #2 receive, as the institutions of first deposit, payments received from their customers P1, P2, P3, PN, the payees of checks written by check writers/drawers C1, C2, C3, C4, C5, CN. Bank 10 is a bank of subsequent deposit that further submits the payments or checks received from the correspondent banks and institutions into the payment system for collection and clearing. This example is an illustration of the present invention whereby multiple smaller institutions that do not process the volume of instruments as a check payee 1, such as in Example 1, or larger institutions that typically outsource certain functions, may achieve the advantages of the invention through their utilization of a bank of second deposit, collecting and clearing bank 10.

At a location 17 remote from collecting and clearing bank 10, the checks from the customers of correspondent Bank #1, correspondent Institution #2, etc. are indorsed respectively in the names of correspondent Bank #1, correspondent Institution #2, etc. by indorser 11, on their own behalf as the bank or institution of first deposit. An indorsement is also applied to the checks by the indorser on behalf of bank of second deposit 10. The check amount is added to the MICR line. (The addition of check amount and indorsement information to the check are known elements of the check processing routine). CPUs 15 and 16 associated with correspondent Bank #1 and correspondent Institution #2, respectively, provide a communication link with the remote location whereby check and settlement information available to the sorter of the bank of second deposit is exchanged. At the remote location, the indorsed checks are commingled and sorted by sorter 12 in accordance with predetermined sort pattern categories determined by bank of second deposit 10 and a cash letter is prepared in the name of bank 10 for each group of checks within the predetermined sort category. Electronic information about the checks and cash letter is transmitted from the indorsement and sorting site to bank 10 via CPUs 13 and 14 respectively, for use in bank 10's recording of the deposit of the checks in the respective accounts of correspondent Bank #1, correspondent Institution #2, etc., maintained at bank 10.

From the sorter site, the electronic cash letter information is delivered directly into the payment system and further physical handling of the checks is truncated. Although the bank 10 is the collecting and clearing bank for the checks of Bank #1, Institution #2, etc., the physical checks are not handled by bank 10. Instead, the check deposits, clearings and collections are monitored by electronic communication links and CPUs 13 and 14 at the locations of the indorsement applier 11 and sorter 12 and collecting and clearing bank 10.

The preparation of the cash letters for the sorted checks that are delivered from the sorter directly into the payment system is in accordance with sort pattern criteria determined by the bank of subsequent deposit for collecting and clearing.

Figure 3:
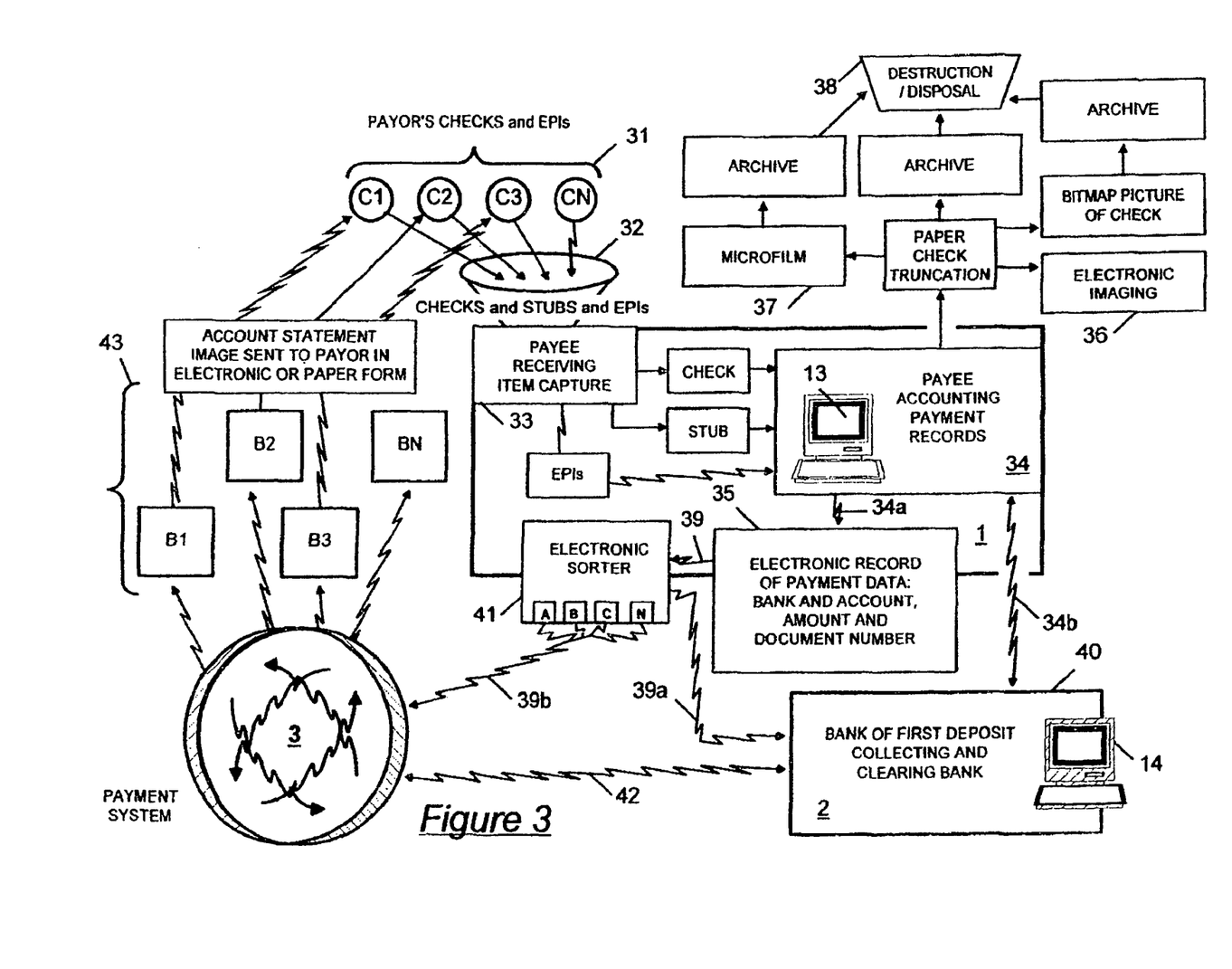
FIG. 3 is a chart depicting the processing of commingled checks and EPIs, and the electronic transfer of information derived therefrom, from the payee to the depository bank and into an electronic payment system/clearing house resulting in the ultimate collection of funds from the account of the payor, as such activities are coordinated by processing means at locations of the check payee and the depository bank. Paper checks are not delivered into the payment system by the payee or depository bank in this embodiment and handling of the checks is truncated at the payee site.
Figure 4:
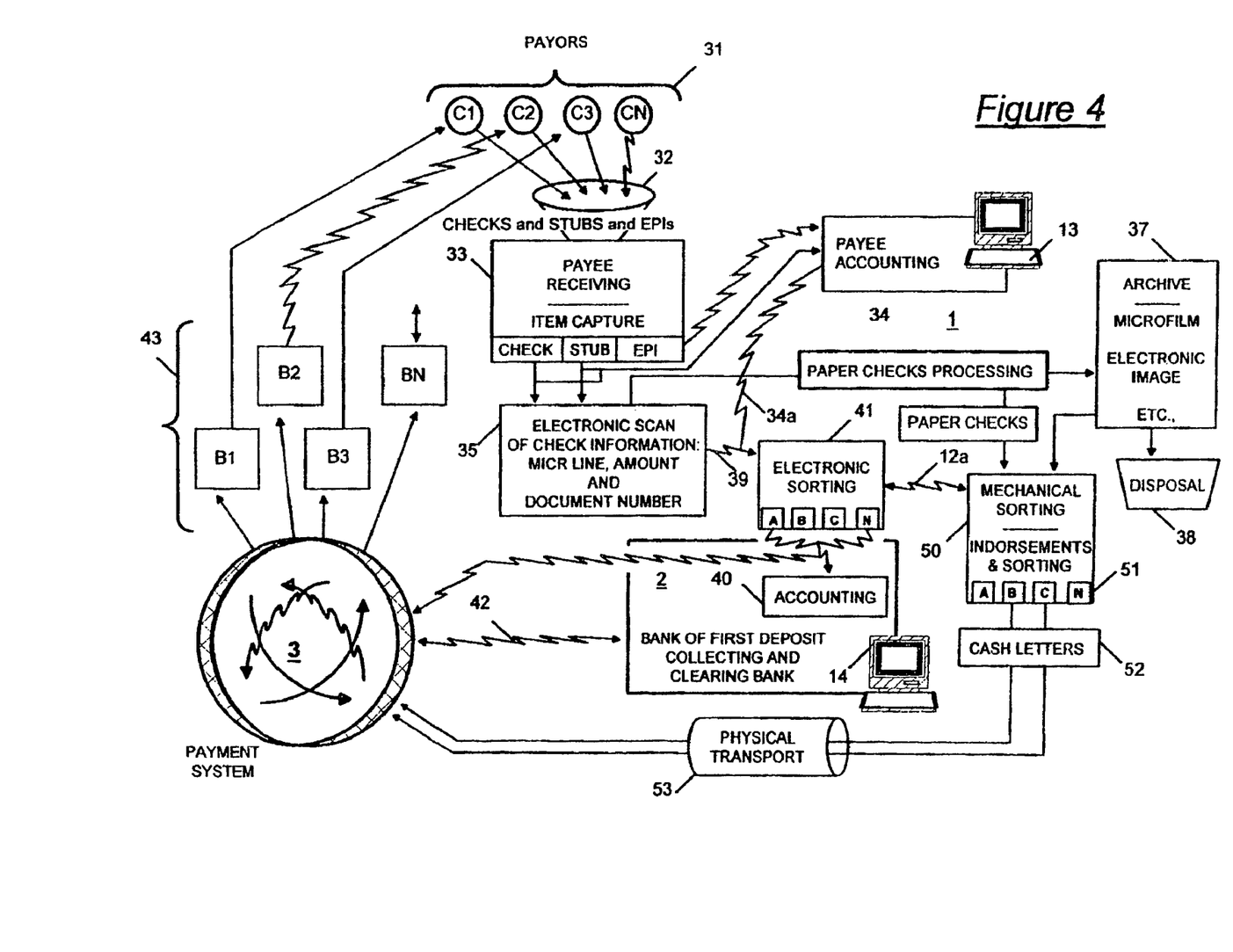
FIG. 4 depicts an embodiment in which commingled payments are delivered from the payee into a payment system capable of effecting settlement of both paper and electronic instruments.

Truncation options useful with Examples 1 and 2 are described in more detail with regard to FIGS. 3 and 4. Thus, the controlled system described herein accelerates the collection process by eliminating the need for, and the time consumed by, the physical transport of checks to the depository bank and the subsequent physical transport of the checks and submission of checks into the check payment system by the depository, or collecting and clearing bank and allows the commingling of EPIs with electronic records of physical instruments in the clearing and payment process. In the first example, dual sorting and dual capture of information by both the payee and a bank of first deposit is eliminated. Likewise, the need for repetitive sorting of the same instrument or data record by both the payee bank and the bank of first deposit is also eliminated when the collecting and clearing bank is a bank of second, or subsequent, deposit. The inter-relationship of the depository bank, or the collecting and clearing bank, with the sorter and indorsement applier is effected by electronic communications and a control system of processing computers at one or each of the bank and the sorter. The CPU at that location transmits MICR line data to the collecting and clearing bank. The cash letters for the sorted checks on behalf of the collecting and clearing bank are prepared at the remote customer's or sorter's location. Physical items or data records that would otherwise require double handling, first by the customer/depositor and then by the collecting and clearing bank are now singly handled at the point of sorting. Check handling and preparation for submission to the payment system are thus integrated.

As handling is reduced, redundancy is eliminated, cost is reduced and error caused by repetitive transfer and handling of numerous checks are also reduced. The payments are forwarded to predetermined sort pattern categories in the payment system according to the sort patterns established by the collecting and clearing bank. Hence, with reference to Example 1 and the local utility, most of the payments received by the utility would likely be drawn on banks in the utility service area, and the clearing of the checks would be effected through the local payment system. The collecting and clearing bank, in a location other than that of the utility, maintains an electronic link for settlement purposes for participation in that local payment system.

By contrast, the payee in Example 1 and the indorsement/sort service provider in Example 2 also become the archive on behalf of the collecting and clearing bank for the received checks in the event of truncation, as well as for itself, whereby each check received by the payee is microfilmed or imaged and assigned a document identification number or otherwise transformed into an electronic data record that may also include images of a physical instrument. In Example 2, the sorter may also be the archive for Bank #1, Institution #2, May 10, 1999, that are serviced by the collecting and clearing bank.

Thus, the invention provides a system for effecting the deposit, settlement and submission for collection of funds represented by financial instruments that are received by a payee at a location remote from the payee's depository bank. The instruments are presented for payment to multiple institutions in the check payment system.

A sorter, which is a well known machine in the banking industry, is placed at a first location established by the payee. The sorter receives the tangible financial instruments in high volume from the payee's customers. The sorter sorts the instruments according to predetermined sort pattern categories determined by the depository bank. Indorsements of the instruments on behalf of the payee and the depository bank with respect to each check received are applied by a printer or stamping mechanism before, during or after the sort process. The sorter will generally assemble the sorted instruments into discrete groups with respect to the predetermined sort pattern categories. A cash letter associated with each assembled group of sorted instruments is prepared by the payee on behalf of the depository bank.

A communication link between the payee location and the depository bank enables the payee to report to the bank the information about the checks in the cash letters and permits the bank, upon receipt of the information to anticipate in the bank a deposit in the payee's account corresponding to the cash letter(s). When the bank receives confirmation that it has received credit for the cash letter through the check payment system, it makes the funds available to the payee.

These physical means are coordinated by a central processing unit and communication links between the parties involved in the payment process. In this manner the timing of the physical transport of the instruments for submission into the check payment system and/or the transmission of an electronic cash letter and associated data records of individual payments is controlled and the delivery of the sorted payments, whether in electronic or physical form, into the payment system is confirmed and verified. The recording of the payments as a deposit in the payee's account with the depository bank, or the collecting and clearing bank, is thus coordinated with the timing of the issue of a credit to the bank when a settlement of the accounts represented by the checks is received through the payment system. With physical instruments, the transport of the instruments and the associated cash letters from the first location to a payment system endpoint is effected by conventional ground or air delivery.

The present invention is a system for processing checks and other financial instruments. A check payee, as an agent of the depository bank processes the checks at their point of receipt as an adjunct of the payee's internal invoice accounting system. The payee performs according to criteria and procedures mandated by the payee's depository bank, at a location remote from the bank's conventional collection and deposit processing facilities. The processes of the present invention expedite the processing of checks by the payee and the payee's depository bank; the submission of the checks for payment into the payment system; and the deposit and availability of funds represented by the checks into a depositor's account.

EXAMPLE 3

Example 3 is an embodiment in which physical paper checks are not transported from the payee's location. Appropriate information from the checks is extracted and converted into electronic form for sorting, processing and transmission into and through the payment system. The physical checks are disposed of, typically following imaging and archival storage by electronic, optical, microfilm or other means at the payee's location (or other location remote from the depository bank). This embodiment truncates checks at the payee's point of receipt.

With reference to FIG. 3, the check payee and bank customer 1 is a public utility such as a telephone company, or other business entity receiving a large number of periodic payments from numerous customers. In FIG. 3, the drawers of the check or other financial instrument (the customers of the payee) are denoted by C1, C2, C3, . . . Cn, collectively denoted by 31 in FIG. 3. The check drawers (payors) are paying invoices received from the payee and the checks are usually accompanied by a payment stub, invoice containing information about the payee's account, or an order form or the like containing relevant information about the identity of the payor and the purpose of the payment. For the typical case in which the check payee (and bank customer) 1 is a utility, credit card company or other large commercial enterprise, there may be many thousands or millions of customers 31, submitting payments to payee 1, often periodically and typically monthly. The method of payment and delivery of payment to the payee, denoted by 32 in FIG. 3, is typically via the mail. In-person delivery, commercial messenger, and other forms of delivery of checks to payee 1, are also utilized by some customers.

In the present invention, the check payee 1 typically receives these payments and associated statements through a functional component of the receiving organization known as remittance processing in retail organizations, or deposit processing when received by a bank. Item capture 33 in FIG. 3 represents these functions. Item capture 33 will typically occur at a location convenient to the payee's accounting functions 34. Check receiving and item capture functions may be located at strategic bill collection points within the payee's service region. Most typically, the check receiving and item capture function of the payee will compare a payment stub with the enclosed check and send the check on for further processing. The payee processes the payment stub commonly received along with the check further and the funds represented by the check are reconciled with the check drawer/payor's account. The stub may be stored in archival storage as paper, microfilm, etc., or otherwise used to account properly for the customer's payment. Payment stub processing and internal accounting procedures for the reporting and allocation of payments, are adjuncts of the funds collection system of the invention herein.

FIG. 3 relates to an embodiment of the present invention in which paper checks, or similar instruments are not forwarded by the payee for processing through the depository bank or payment system. Because physical transport of checks is not required, mechanical sorting of the paper checks received is not necessary. The embodiment of FIG. 3 uses electronic transmission of information related to electronically sorted information about checks and EPIs received and electronic cash letters related to the particular groups of sorted payments. Therefore, sorting, reconciliation, etc., is effected by electronic means and paper checks are truncated and have no need for mechanical processing or delivery. Following receipt and item capture by the payee, the check will advance to scanning and processing in the electronic scanning block 35 of FIG. 3. In this step, the check is scanned by a suitable reader. (This processing step may also include verification of the data collected electronically by human operator comparison of the electronic data with the physical check and the payment stub.) The data thus collected will typically include the MICR (Magnetic Ink Character Recognition) data from the MICR lines of the checks. The amount of the check and a date will also be collected, or an electronic image of the check, or selected fields thereof (such as payee and/or amount, shown in the check writer's own handwriting) (optionally verified by a human operator) will be made. This data is included with the electronic record to be associated with each check and represents data from which the transaction record conveyed to the check writer in periodic statements of account is derived. In the typical practice of the invention, electronic indorsements on behalf of the payee and the depository bank will be applied to the electronic record of the check or EPI; a document identification number will also be generated and added to the electronic record of the check to aid in subsequent location and retrieval of the information concerning the particular check. This information typically collected from the MICR line and the check amount is referred to as bank information. The payment stub information comprises the information necessary to the payee derived from the payment stub to reconcile the payment with the check payor's account with the payee.

Because this embodiment does not forward paper checks into the payment system, there is no need for the check amount to be added to the MICR line of the physical check, as is a common procedure in current check processing operations. Amount imprinting is rendered unnecessary by this embodiment of the present invention.

FIG. 3 also shows the accounting function of the check payee 34 following the electronic scanning of the data from the check 35 or the receipt of an EPI. Payee accounting 34 may also include the processing of payment stubs directly from the payee receiving item capture function 33 in place of, or in addition to, the processing of information from the check. The information flow within the check payee's organization from item capture 33 to the check payee accounting function 34 is a matter of payee preference. Payee accounting 34 is electronically linked to the electronic scanning and the electronic receiving, in the case of an EPI, function 35 via 34*a*, and is electronically linked to the depository bank 2 via communication link 34*b*.

In FIG. 3, box 36 indicates the creation of an image of the check for archival storage 37 prior to possible disposition of the paper instrument 38. An image of the physical check is created. This image is preserved and may be reproduced as a copy of the check for purposes of signature comparison, amount verification, etc. if needed. The image may be an optical or electronic gray-scale or color image of the check maintained archival in storage in pixel-by-pixel digital, optical, magnetic, electronic, fully optical or other storage technology from which information can be derived. Alternative storage mechanisms include microfilm, video tape, laser disc or other tape or direct image storage technology. This functional block 37 of FIG. 3 is not limited to any particular technical embodiment; a form of image of the actual physical check is stored, capable of later retrieval, from which detailed information related to the check and its visual appearance may be displayed. Following the storage of the check, disposal of the paper instrument 38 may occur.

Disposal of the physical paper check (by destruction, recycling, etc.) 38 at the location of the payee 1 occurs in one embodiment of the present invention. Terminating the transport of the physical paper check at a point in the collection and clearing process and eliminating the return of the check to the check writer is referred to as a "truncation" of the check at that point beyond which the check is not physically sent. The check may be physically destroyed or placed into archival storage. In practice, the physical checks may not be destroyed, but may be placed in warehouse storage for a period determined by banking policies. Disposal 38 of the paper checks may involve either the physical destruction of the instrument or archival storage of the paper check in addition to imaging 36 of the check and the storage 37 of the image in a space-efficient form.

Other truncations are consistent with the present invention resulting in more effective check collecting processes for both the payee and the depository bank. Truncation at the point of sale in which the information transmitted to the bank of first deposit is an EPI is an embodiment in which the MICR line, and check amount (and optional additional information) is extracted from the check for electronic transmission. For retail establishments such as grocery chains and the like that receive large numbers of point of sale checks, the present invention is applicable with the location of the payee being the point of sale check receiving establishment. Point of sale capture may, but need not necessarily, include imaging of the check.

Other truncation schemes are possible in which the physical paper check is sent beyond the payee to the depository bank, or to the payor bank, or elsewhere in the check collection system.

The image function 36 is depicted in FIG. 3 separately from the electronic scanning function 35 for clarity in graphical depiction. The electronic scanning for extraction of the data from the MICR line, etc., may be combined with the imaging of the check to reduce check stacking, feeding, positioning and other mechanical manipulation steps for the proper items. Whether scanning 35 and imaging 36, in FIGS. 3 and 4, are combined in one piece of equipment, or more than one, is a matter of convenience.

In FIG. 3, the image 37 is stored at the payee's location in an archival storage facility 37. However, this image of the check may also be transmitted electronically to the bank along with the other information extracted from the check. The amount of information in the image is typically greater than the transactional information extracted from the MICR line and is added to the electronic record of the check. Thus, transmission of the image requires greater communication capacity than transmission of the transactional check data alone. The information from the electronic scanning 35 performed at the payee's location is transmitted via a suitable communication links 39 and 39*a* to the depository bank 2. At the depository bank, the appropriate adjustments of the payee's account balances by the depository bank are carried out 40. The payee's account is credited with the appropriate amounts as such are compiled by the payee and the information thereof is received electronically from the payee. The electronic check information is sorted and routed via an appropriate electronic communication link 39*b* with appropriate electronic information added thereto to insure proper routing through the payment and clearing system to the appropriate payor bank. Electronic information of the sorted checks transmitted for particular payor banks, the equivalent of a cash letter, is included with each electronic bundle of checks and EPIs.

The electronic check information as sorted, grouped and annotated 41 by the depository bank is sent via an appropriate communication link 42 into the payment system 3. The payment system 3 includes clearing institutions such as the Federal Reserve Banks, correspondent banks, The National Clearinghouse Association (described in U.S. Pat. No. 5,265,007), the electronic check clearing house organization (described in Stephens et al., supra), and like mechanisms. Having a direct relationship to the check payment system, the collecting and clearing depository bank 2 is considered a part of the check payment system.

In FIG. 3, the payment system 3 is electronic and receives EPIs, electronic check records and associated electronic cash letters and bundles from depository bank 2 and other banks of first and subsequent deposit (not depicted on FIG. 3) intended for various payor banks, B1, B2, B3 . . . Bn, collectively denoted as 43 in FIG. 3. The information from the payment system 3 reaches the appropriate payor banks 43 for proper debiting of the accounts of the payors 31 thus completing the payment cycle. In the event of dishonor of a payment by a payor bank, the process reverses as to the collection of the dishonored payment, and this information may be transmitted electronically back through payment system 3 (or by other direct means) to depository bank 2 for unwinding the transaction and for debiting of the payee's account as to the dishonored payment.

Submittal of a customer account statement to customers C1, C2, . . . Cn can be sent electronically, as shown with regard to C1 and C3 of FIG. 3, or by conventional paper copy as shown with regard to C2. In either case, the account statement may include an image of the check or images of selected portions of the check.

Modifications of the system of FIG. 3 are apparent to those with skill in the art. For example, electronic sorting, routing, grouping and preparation of electronic cash letters may be merged completely at the payee's location 1 with the depository bank's function 41 comprising the extracting of cash letter information as the electronic transmission passes through communication links 39 and 42. The electronic information thus extracted by the depository bank would enable the updating of the depository bank's account balances for the payee. Checks or EPIs written by payors C1 . . . who are also customers of the depository bank 2 would be cleared and appropriate fund transfers made immediately at the depository bank. Conversely, minimal processing may be performed at the payee's location and the steps of item capture, scanning, imaging, sorting, and depositing into the payment system could be performed at a different location. The image 36 is transferred via a communication link 39 from payee 1 to depository bank 2 for financial information processing and archival storage. This embodiment may be particularly suitable when the payee is a retail establishment receiving numerous point-of-sale checks but lacking internal accounting facilities. In any event, when electronic records are sorted and sent to the payment system, the data required for truncated checks and EPIs will be the same, although check records may have additional record fields, such as for a payee image and the like.

The timing of transmissions between payee 1, depository bank 2, and the payment system 3, typically occurs according to predetermined schedules established by the bank, the payee customer of the bank and/or the payment system itself. Communications between payee 1, depository bank 2, and the payment system 3 will be under the control of a central control/processor unit 14 according to criteria established by the depository bank. This control unit coordinates, synchronizes, times and avoids interference in and among the various communications involving the depository bank 2 and the payee 1, and insures compliance with schedules necessary for the check payment system.

FIGS. 3 and 4 show a single control unit 14 at the location of the depository bank 2. Alternatively, it may be convenient to have the control function at the payee's location 1 or to split the control function between processors located at the payee's location, the depository bank's location or elsewhere, provided, however, that the bank determines the control, coordination and transmission protocols and the submission and collection of funds over the payment system 3.

The present invention depicted in FIG. 3 is contrasted with the traditional check payment and processing procedures in which funds represented by checks received for payment of an amount are matched with the customer's invoice or account internally and the physical paper checks are indorsed and physically transported to the depository bank for deposit in the payee's account. Conventionally, the depository bank repeats the reading, sorting, indorsing and packaging the physical checks for submission into the payment system according to the depository bank's preferred sort pattern categories. Cash letters are then prepared by the depository bank, associated with the bundles of sorted checks and together they are introduced into the payment system to complete the processing. The invention depicted in FIG. 3 does not require physical sorting, bundling or indorsing of the paper checks or transportation of the physical checks from the payee to the depository bank. Only a single mechanical processing of the physical checks during the scanning operation 35 at the payee's location is required and the electronic check records may be bundled with EPIs for sorting, clearing and subsequent processing.

EXAMPLE 4

In the example depicted in FIG. 4, electronic transfer and processing of payments occur and paper checks follow at some later time for confirmation, reconciliation and storage by the payor bank and/or for return to the drawer. Paper checks in this system are truncated at a point beyond the bank of first deposit, usually at the payor bank, where the checks are stored or imaged for archival storage and then disposed of.

In the example of FIG. 4, checks or other paper financial instruments are received by payee 1 from numerous check writers 31 via the mail or other delivery means 32 as described in connection with Example 3. The checks are received at item capture site 33, scanned 35, accounted for 34, and imaged 36, in a manner explained with respect to Example 3. Because the physical paper checks are preserved, imaging and/or storage of the images are not necessary unless the image is transmitted along with other bank information and used for long term archival storage.

The processing steps, and modifications thereto, are essentially unchanged in Example 4 when compared with the all-electronic processing of Example 3. Electronic information scanned from the check at 35 and EPI data otherwise received, is transmitted via communication link 39 to depository bank 2 for sorting, processing, and bundling 41. This information is entered in the payee's account 40. The bundled electronic payment information and accompanying electronic cash letters are forwarded into the payment system 3 via communication link 42 under the bank's control through processor 14, all essentially as described in connection with Example 3.

The embodiment of Example 3, however, is one in which, for checks, the physical paper check is presented through the payment system 3 for delivery to one of the payor banks 43 (or otherwise truncated at some point within the payment system beyond the check payee). The paper check follows the electronic information previously transmitted via 42 into the payment system 3. Thus, this embodiment is a paper-to-follow system providing rapid processing of the essential financial and accounting information represented by electronic records of the checks. The physical checks follow thereafter. The paper check in this embodiment is processed by indorsing, sorting, bundling, routing, and the generation of a physical cash letter to accompany the physical bundle (or bundles) of checks through the payment system. Indorsements to checks on behalf of the payee and the bank of first deposit are applied to the check by a payee at the payee's location.

In FIG. 4, electronic records of check data and EPIs and paper checks are shown to be sorted, respectively, by electronic sorter 41 and mechanical sorter 50 in sort pattern categories determined by depository bank 2. The depository bank may require electronic records or physical checks as formats which are sorted according to pattern categories such as check volume in a predetermined geographic area, the financial institution(s) on which the checks were drawn, the geographic or commercial area of a bank that will otherwise accept a check for clearing and collection, or other sort pattern categories. The various categories into which the physical checks are thus sorted are denoted schematically by pockets 51 in sorter 50 and in its electronic analogue in electronic sorter 41 of FIG. 4. In this embodiment, physical processing 50 will typically include indorsing the checks, both for the payee and for the depository bank at the payee's location. An institutional indorsement is conventionally applied as payment instructions and includes the identity of the indorser on the reverse side of a check. The mechanical sorter 50 is also electronically linked to the electronic sorter via 12a so that check and EPI data may be commingled.

The mechanical processing of checks at payee's location 50 may also include the generation of physical cash letters 52 to accompany the bundles of sorted checks into the payment system 3. The bundles of checks with accompanying cash letters are physically transported into the payment system by means of any conventional, customary or useful transport means 53 for processing by the payment system 3 according to conventional procedures.

Here, the electronic processing of the funds represented by the checks precedes, and typically does not wait for, the arrival and processing of the physical paper checks. Thus, the information relating to the potential availability of drawer funds in the payor bank 43 is expeditiously made known through the payment system electronically to the depository bank 2. The paper checks follow directly from the payee, on behalf of the depository bank, directly into the payment system, also in an expedited manner according to the present invention, since separate sorting and indorsing by the payee and the depository bank are combined into a single sorting and indorsing function 50 at the payee's item capture facility. The separate transport of paper checks to depository bank 2 is unnecessary. The timing of steps is synchronized and coordinated with respect to (a) the check payee 1 and the bank of first deposit 2 via communication link 39 (b) the check payment system 3 with respect to the indorsing and sorting of checks 50 and 51 (c) the transmission of check MICR information via communication link 42 and the submission of doubly indorsed checks into the payment system 3 via physical transportation 53 and (d) the payment of funds represented by the checks (or the dishonor of a check) by payor banks 43. Coordination under the direct control of the depository bank, according to criteria established by the bank, insures availability to the payee of deposited funds in compliance with federal regulations, depository bank policy, and/or contractual agreement between the payee and the depository bank.

In the prior art, once the check payee 1 processed and indorsed the payment checks received to reconcile its own and its customer's accounts, the payee would physically transport the indorsed checks to its depository bank 2 where the payee maintains an account and the checks would be deposited to the credit of the payee's account. The depository bank, being the bank of first deposit, would separately indorse the checks on its own behalf and submit the checks into the check payment system resulting in the ultimate payment of funds represented by the checks from the check writer's account at payor banks (or the dishonor of the check). In that process, the bank of first deposit would apply its own indorsement to the checks already indorsed by the payee and would physically sort the checks and prepare any accompanying cash letter for delivery into the check payment system where settlements with other financial institutions on which the checks were drawn would be effected. Such a settlement involves the physical transport and exchange of the checks, and a calculation of aggregate amounts owing and payable by participants in either a bi-lateral or multi-lateral settlement at a predetermined time. After settlement, the payor bank would physically have custody of the check and would conventionally process the check for its customer's account.

In contrast, the present system provides that the check payee 1 in its own processing of the checks, at a site distant from the location of the depository bank 2, indorses the check for payment both on its own behalf and on behalf of the bank of first deposit where the check payee 1 maintains an account and deposits the funds represented by the check. In its processing of the checks, the payee will typically add the check amount to the MICR line and date information about the check. The indorsed checks and/or their electronic records are sorted by the check payee in accordance with predetermined sort pattern categories 51 selected by the depository bank. The payee prepares a cash letter, in electronic format, or in physical format 52 when the checks are physically sent, in the name of the depository bank for each group or bundle of checks within the predetermined sort category. The particular order of operations shown in FIG. 4 is not intended to exclude other equivalent sequences. For example, the electronic scanning of the checks 35 may be performed by the same physical equipment at substantially the same time as the mechanical sorting and indorsing 50 and 51, and the preparation of cash letters 52. Other modifications will be obvious to those of skill in the art.

Improvements in efficiency and time, and a reduction in paper handling is achieved by the system of the present invention as compared with the repetitive instances of physical handling, multiple transportation, and duplicative sorting and indorsement encountered in the prior art. Delivery of physical items to the bank of first deposit is eliminated. Two indorsements of the check are applied at the same time, instead of twice at the different locations of the payee and the bank of first deposit. The payee/customer applies the bank endorsement on behalf of the bank. The faster collection of funds, to the benefit of the payee and the bank in the check collecting and clearing sequence is achieved.

Thus, the system accelerates the payment collection process by eliminating the need for, and the time consumed by, the physical transport of checks to the depository bank and the subsequent physical transport of the checks and submission of checks into the check payment system by the depository or the collecting and clearing bank. Separate sorting of checks and EPIs and capture of information by both the payee and a bank of first deposit is eliminated. The inter-relationship of the depository bank, or the collecting and clearing bank, with the sorter and indorsement applier is effected by electronic communications and a control system of processing computers at one or each of the bank and the payee. The cash letters for the sorted checks on behalf of the collecting and clearing bank are prepared at the remote customer/payee's location. Physical items that formerly required double handling, first by the customer/depositor and then by the collecting and clearing bank are now singly handled at the point of receipt at an item capture facility where the beginning of the payment process also includes the introduction of the payor and payment identifier information into the customer/payee's own account records. Not only is the collection of funds expedited, but because the system is integrated at the payee site with the payee's own internal accounting system, added efficiencies to the overall process of bill payment and funds collection are achieved both by the payee and the bank of first deposit.

As handling is reduced, redundancy is eliminated, cost is reduced and errors caused by the transfer and handling of numerous payment records are also reduced. Payments are forwarded according to predetermined sort pattern categories into the payment system as established by the collecting and clearing bank. Hence, with reference to Example 3 and a local utility as an assumed payee, most of the payments received by the utility would likely be drawn on banks in the utility service area, and the clearing of the payments would be effected through the local clearing house system or on a bilateral or multilateral basis. The collecting and clearing bank, if in a location other than that of the utility, maintains an electronic link for settlement purposes for participation in that local clearing house payment system.

The payees in Example 3 and in Example 4 may also establish and maintain an archive on behalf of the depository bank for the received checks, as well as for itself, whereby each check received by the payee is (or could be) microfilmed or imaged and assigned a unique document identification number for retrieval purposes.

Thus, the invention provides a system for effecting the deposit of checks and the collection of funds represented by checks and EPIs that are received by a payee at a location remote from the payee's depository bank and presented for payment to multiple institutions in the payment system.

A communication link between the payee and the depository bank enables the payee to report to the bank the information about the payments and cash letters and permits the bank, upon receipt of the information, to anticipate in the bank a deposit in the payee's account. Typically, when the bank receives confirmation that it has received credit for the cash letter through the payment system, it makes the funds available to the payee, although other contractual arrangements between particular payees and its depository bank may be negotiated.

The timing of communications and the scheduling and confirmation of payment processing activities are coordinated by a central processing unit and communication link among the parties involved in the check payment process. In this manner the timing of the transmission of payment instrument data for submission into the payment system is controlled by the depository bank and the delivery by the payee of the sorted checks data records and EPIs into the payment system is confirmed and verified to the bank by the payee and through the bank's link into the payment system. The recording of the payment deposit as withdrawable funds in the payee's account with the depository bank is thus coordinated with the timing of the issue of a credit to the bank when the payments are cleared through the payment system and the bank's account in the payment system is credited with funds received. The electronic transmission of bundled (sorted) instruments and the associated cash letters from the payee's item capture facility location to a payment system receiving point is effected by communication links as shown in the figures.

In certain circumstances, it is desirable to verify the cash letter or bank information at one or more stages. For example, the image of the check produced as 36 in FIG. 3 and FIG. 4 may be verified, electronically or manually, with the check-by-check bank information extracted electronically 35. In another embodiment, the electronic cash letters generated at 41 or 35 are compared with the electronic bank information at more than one location, by more than one piece of equipment, and/or by more than one human operator. Verification of physical cash letters 52 against electronic bank information and/or the images of the checks themselves is also an adaptation of the present invention. When images are transmitted through the communications links 39 and 42, it becomes easier for multiple verifications to be made comparing the bank information and cash letters with each other and with the check image itself. Although data encryption is employed as a security measure in electronic funds transfer (and presumed herein), additional data checks and verification at several points along the transmission system enhance security. Redundant parallel communications links, with a different encryption procedure for each, allow the comparison and verification of the bank information at both ends of the parallel, encrypted transmissions. Given the foregoing disclosure, it is evident that the benefits of the system described herein may be extended to numerous types of commercial activities in which a volume of checks is received. The examples described a utility as a payee. The benefits of the present invention will be most apparent to bank customers that receive a large number of periodic check payments from numerous of their own customers. Individual banks themselves may establish a relationship with a bank using the present invention. In this case, the depository bank 2 in FIG. 3 and FIG. 4 would be a bank of second (or later) deposit, receiving electronic information, and/or checks from another bank as its customer 1. The depository bank 2 would be an outsource processor for the other bank. There is no essential change in the present invention whether the bank customer 1 is a commercial entity or itself a depository bank for commercial entities.

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrated and described. Rather it is intended that the scope of the invention be determined by the appended claims.

What is claimed is:

1. A process for coordinating receipt of payment instruments in a physical form received at a payee's facility remote from a depository bank with processing of the payment instruments and collection of funds represented by the payment instruments through a payment system wherein recordation of receipt of the payment instruments by the payee is recorded by the payee and the payment instruments are transmitted to said payment system for payment to the payee comprising:

a) recording payment information from payment instruments in a physical form corresponding to payments received at the payee's facility remote from a depository bank and recording the receipt of the payments;

b) at the payee's facility remote from a depository bank, creating an electronic data file representing payment information fields associated with the payment instruments, and processing the payment instruments; extracting payment data from the electronic data file; and processing the payment instruments electronically according to data extracted;

c) at the payee's facility remote from a depository bank, associating the payment instruments with a record of an account of the payee;

d) at the payee's facility remote from a depository bank, extracting payment system information from the payment instruments and converting said payment system information into a transmittable record of the payment;

e) at the payee's facility remote from a depository bank, separating payment instruments received by the payment system in accordance with destination points in the payment system based on the payment instruments;

f) at the payee's facility remote from a depository bank, acknowledging receipt of each of said payment instruments with an identification on behalf of said payee;

g) at the payee's facility remote from a depository bank, indorsing, on behalf of the payee and a depository bank, the payment instruments bearing an identification and assembling separated payment instruments into at least one batch associated with at least one category;

h) at the payee's facility remote from a depository bank, preparing at least one cash letter associated with the at least one batch of payment instruments and delivering the at least one cash letter and associated at least one batch into the payment system for payment to the payee; and i) processing said at least one cash letter and associated batch delivered into said payment system whereby the instruments are cleared for ultimate payment, wherein at least one of the above steps is performed by one of a computer or a computer processor.

2. The process of claim 1, further comprising generating transmittable records of the payment instruments, which comprise checks, according to data extracted from magnetic ink character reader (MICR) lines on the checks and associating amounts of the checks with the data extracted from the MICR lines before records of the checks are delivered into the payment system.

3. The process of claim 2, further comprising truncating the physical processing of the checks upon assembly of data files with payment information from the checks to create a payment data file to be transmitted into the payment system.

4. The process of claim 3, further comprising archiving the checks.

5. The process of claim 1, further comprising monitoring the payment of said instruments in the payment system such that funds represented by the instruments that are received are indicated to be credited to the payee's account at an institution within the payment system with which the payee is associated.

6. A process for coordinating receipt of electronic payment instruments at a payee's facility remote from a depository bank with processing of the electronic payment instruments and collection of funds represented by the electronic payment instruments through a payment system wherein recordation of receipt of the electronic payment instruments by the payee is recorded by the payee and the electronic payment instruments are transmitted to said payment system for payment to the payee comprising:

a) receiving at the payee's facility remote from a depository bank the electronic payment instruments in the form of a payment media from which an electronic data file having fields corresponding to the payment may be derived, creating an electronic data file having fields representing payment system information with which the payment media and the payment are associated, and recording receipt of the electronic payment instruments;
   b) at the payee's facility remote from a depository bank, processing the electronic payment instruments electronically according to data extracted;
   c) at the payee's facility remote from a depository bank, associating the electronic payment instruments received with a record of an account of the payee;
   d) at the payee's facility remote from a depository bank, extracting payment system information from at least one of the electronic payment instruments and the data file and converting said information into a transmittable record of the payment;
   e) at the payee's facility remote from a depository bank, separating the electronic payment instruments received by the payment system in accordance with destination points in the payment system based on the electronic payment instruments;
   f) at the payee's facility remote from a depository bank, acknowledging receipt of each of said electronic payment instruments with an identification on behalf of said payee;
   g) at the payee's facility remote from a depository bank, separating the electronic payment instruments bearing identifications and assembling electronic payment instruments into at least one batch associated with at least one category; and
   h) at the payee's facility remote from a depository bank, preparing at least one cash letter associated with the at least one batch of electronic payment instruments and delivering the at least one cash letter and associated at least one batch into the payment system for payment to the payee,
   wherein at least one of the above steps is performed by one of a computer or a computer processor.

7. The process of claim 6, wherein the payment media comprises electronic payment instructions.

8. A system for coordinating receipt of electronic and physical payment instruments at a payee's facility remote from a depository bank with processing of the payment instruments and collection of funds represented by the payment instruments through a payment system wherein recordation of receipt of the payment instruments by the payee is recorded by the payee and the payment instruments are transmitted to said payment system for payment to the payee, wherein said system comprises:

a) a receiver structure configured to receive the payment instruments at the payee's facility remote from a depository bank and determine whether each of the payment instruments is in a form of a physical instrument or in a form of an electronic instrument;
   b) a recorder structure configured to, at the payee's facility remote from a depository bank, record the receipt of the payment instruments;
   c) an associator structure configured to, at the payee's facility remote from a depository bank, associate an instrument received with a record of account of the payee;
   d) an extractor structure configured to, at the payee's facility remote from a depository bank, extract payment system information from the instrument received and convert said information into an electronic record of payment;
   e) an assignor structure configured to, at the payee's facility remote from a depository bank, assign a unique identifier to each electronic record of payment and associate the unique identifier and the electronic record of payment with each other in a transmittable file;
   f) a first separator structure configured to, at the payee's facility remote from a depository bank, separate transmittable files by the payment system in accordance with destination points in the payment system based on the payment instruments received;
   g) an acknowledger structure configured to, at the payee's facility remote from a depository bank, acknowledge receipt of each of said transmittable files with an identification on behalf of said payee;
   h) a second separator structure configured to, at the payee's facility remote from a depository bank, separate the transmittable files bearing identifications and assemble the transmittable files into at least one batch associated with at least one category;
   i) a preparer structure configured to, at the payee's facility remote from a depository bank, prepare at least one cash letter associated with the at least one batch of transmittable files and deliver the at least one cash letter and associated at least one batch into the payment system for payment to the payee; and
   j) a trunctator structure configured to, at the payee's facility remote from a depository bank, truncate processing of payment instruments received in physical form upon the extraction of payment system information from the payment instrument and conversion of said information into an electronic record of the payment.

9. The system of claim 8, wherein extracting payment system information from the instrument and converting said information into an electronic record of the payment includes creating a record comprising payor, payee, payment institution of payee, payment institution of payor, routing information and transit information.

10. The system of claim 8, further comprising a controller for controlling and coordinating transmissions between the payee facility and the payment system in accordance with predetermined criteria established by the payment system.

11. The system of claim 8, further comprising: one or more apparatus configured to generate transmittable records of the physical instruments, which comprise checks, according to data extracted from the magnetic ink character reader (MICR) lines on the checks; to associate the amounts of the checks with the data from the MICR lines before the records of the checks are delivered into the payment system; to truncate physical processing of the checks; and at least one of i) to transmit the image through the payment system; ii) to archive the check; and iii) to dispose of the check.

12. The system of claim 8, further comprising one or more apparatus configured to monitor the payment of said payment instruments in the payment system such that funds represented by the payment instruments that are debited from the payor are indicated to be credited to the payee's account at an institution within the payment system with which the payee is associated.

13. A process, as an adjunct of a payee's internal invoice accounting system, for coordinating receipt of payment instruments in a physical form received at a payee's facility remote from a depository bank with processing of the payment instruments and collection of funds represented by the payment instruments through a payment system wherein recordation of receipt of the payment instruments by the payee is recorded by the payee and the payment instruments are transmitted to said payment system for payment to the payee comprising:
   a) recording payment information from payment instruments in a physical form corresponding to payments received at the payee's facility remote from a depository bank and recording the receipt of the payments;
   b) at the payee's facility remote from a depository bank, creating an electronic data file representing payment information fields associated with the payment instruments, and processing the payment instruments; extracting payment data from the electronic data file; and processing the payment instruments electronically according to data extracted;
   c) at the payee's facility remote from a depository bank, associating the payment instruments with a record of account of the payee;
   d) at the payee's facility remote from a depository bank, extracting payment system information from the payment instruments and converting said payment system information into a transmittable record of the payment;
   e) at the payee's facility remote from a depository bank, separating payment instruments by the payment system in accordance with destination points in the payment system based on the payment instruments;
   f) at the payee's facility remote from a depository bank, acknowledging receipt of each of said payment instruments with an identification on behalf of said payee;
   g) at the payee's facility remote from a depository bank, separating and indorsing, as an agent of the depository bank, on behalf of the payee and a depository bank, the payment instruments bearing an identification and assembling payment instruments into at least one batch associated with at least one category;
   h) at the payee's facility remote from a depository bank, preparing at least one cash letter associated with the at least one batch of payment instruments and delivering the at least one cash letter and associated at least one batch into the payment system for payment to the payee;
   i) processing the at least one cash letter and associated batch delivered into said payment system whereby the instruments are cleared for ultimate payment; and
   j) synchronizing and coordinating the timing of steps between the payee, the depository bank and the payment system with respect to the indorsing of checks, the transmission of payment information, the electronic submission of cash letters and check record information into the payment system, and the deposit, collection and verification of funds represented by the checks
wherein at least one of the above steps is performed by one of a computer or a computer processor.

* * * * *